Patented Aug. 3, 1954

2,685,554

UNITED STATES PATENT OFFICE 2,685,554

PENICILLIN PRODUCTION WITH POTASSIUM ACID PHTHALATE AS A FERMENTATION BUFFER

Marjorie A. Darken, Allendale, N. J., assignor, by mesne assignments, to American Cyanamid Company, New York, N. Y., a corporation of Maine No Drawing. Application March 26, 1952, Serial No. 278,753

8 Claims. (Cl. 195—36)

This invention relates to a new and improved process for the production of penicillin and is more particularly concerned with the production of substantially increased yields of penicillin by the addition of an adjuvant to the penicillin fermentation medium.

In a biological process, increased efficiency in the performance of new material into the desired end product is of prime importance. Where the yield in such processes is small and the cost of recovery of the desired product from a large proportion of waste material is high, the yield becomes a controlling factor in the cost of production.

In the production of antibiotic substances from microorganisms by present fermentation methods, the yield of these substances is only a very small fraction of the weight of nutrient materials used in the culture media. Consequently, the desired substances in the spent culture medium must be concentrated and isolated from relatively large volumes of liquor and is commonly effected by means of selective adsorption or solvent extraction processes.

Various methods have been used in attempts to increase the production of penicillin and particularly, penicillin G. Among the methods are those which include incorporating in the fermentation medium certain organic stimulants, precursors, or adjuvants which seem to enhance the production of penicillin, particularly penicillin G, thereby increasing the amount obtainable from a particular fermentation culture.

Owing to its high content of nitrogenous material, carbohydrates, phosphates, and potassium compounds, corn steep liquor has been utilized in some instances as a nutrient adjuvant in the culture of micro-organisms, particularly the yeasts and molds. The use of such a complex mixture, however, is attended by a number of disadvantages arising from a lack of uniformity in the composition of mixtures from different batches and sources. Thus, the lack of uniformity obviously introduces undesirable variations in the penicillin content of the culture filtrate and the heterogeneity and complexity of the components of such mixtures give rise to difficulties in the extraction and concentration of the penicillin.

Some progress has also been made toward increasing the yields of penicillin by supplementing the mold culture media containing corn steep liquor with various substances, chiefly derivatives of phenyl acetic acid and phenylethylamine. These substances actually provide ready-made structural elements which the mold can use in building up the penicillin molecule. In this way, it has been possible to increase the penicillin yield somewhat and also to provide new types of penicillins differing in chemical structure.

In accordance with the present invention, substantial increases in penicillin yields are obtained by fermenting an aqueous nutrient medium containing phthalic acid or a source of phthalate ion with a penicillin-producing mold. Included within the term of potential sources of phthalate ion are salts of phthalic acid, such as for example, sodium, potassium, calcium, etc.

Results indicate that the relative stimulation in penicillin production affected by the use of one strain of Penicillium, such as P. chrysogenum, is in general much the same as that produced with other strains. The effect produced in fermentation media of different types is likewise substantially the same.

It has been observed that when the phthalic acid or a source of phthalate ion is added to a penicillin fermentation medium, an increase of nearly 500 units of penicillin per milliliter is obtained over that which is possible using prior art procedures.

It has been been that a quantity of the phthalate ion such as the acid or the acid salts of phthalic acid, ranging between 0.025% and 1.00%, must be added to the nutrient culture medium in order to obtain the exceptional results which are possible according to the method of the present invention. A preferred embodiment contemplates the addition of about 0.5% of the source of phthalate ion.

Conventional penicillin production procedure involves inoculating a suitable fermentation medium with a sufficient quantity of a culture of a member of the P chrysogenum-notatum group, aerating the medium with sterile air and stirring while conducting the fermentation at a suitable temperature, filtering the mycelium from the broth, and subsequently isolating the penicillin produced. The composition of the fermentation medium does not appear to be critical, but it is usually desirable that the medium contain carbohydrates as a source of carbon; corn steep liquor; an additional source of nitrogen either of protein origin such as beef extract or peptone, or inorganic in nature such as sodium nitrate, ammonium nitrate or other nitrogen-containing salts; acid neutralizing or buffering agents such as calcium carbonate or monopotassium phosphate; small amounts of essential inorganic salts such as magnesium sulfate or zinc sulfate; and various organic chemical substances such as phenylacetamide or phenylethylamine. The term "nutrient medium" as used herein may include or omit these substances although a preferred embodiment of the invention contemplates their use.

The invention is more specifically illustrated by the following examples which are concerned with the production of penicillin by the culturing of suitable molds. Satisfactory methods for the growing of penicillin-producing molds in various types of culture media and for the recovery and purification of the generated penicillin are well-known and are not described here. While the examples relate to the submerged culture technique, it should be pointed out, however, that the invention applies equally well to any other technique of growing the mold and to the culturing of other penicillin-producing molds.

*Example I*

A medium was prepared containing—

| | |
|---|---|
| Corn steep liquor | 20 g./l. (dry basis) |
| Lactose | 50 g./l. |
| β-Phenylethylamine | 2.5 g./l. |
| Sodium nitrate | 3 g./l. |
| Calcium carbonate | 2 g./l. |
| Monopotassium phospate | 0.50 g./l. |
| Magnesium sulfate | 0.25 g./l. |
| Zinc sulfate | 0.04 g./l. |

This medium was distributed into Erlenmeyer flasks and potassium acid phthalate was added at levels of 1.0, 2.0, and 5.0 g./l. The flasks containing this medium were autoclaved at 121° C. for twenty minutes and inoculated with a mutant of *P. chrysogenum*, Wisconsin Q176. The flasks were placed on a reciprocating shaker and incubated at 25–26° C. The results are as follows:

| Amt. of Potassium Acid Phthalate Added | Highest Penicillin Assay |
|---|---|
| | Units/ml. |
| 0.0 | 1,380 |
| 1.0 g./l. | 1,555 |
| 2.0 g./l. | 1,650 |
| 5.0 g./l. | 1,800 |

While the exact mechanism of the present process is not definitely known, its explanation appears to reside in the pH control. The penicillin-producing organisms apparently produce penicillin as long as the pH of the medium remains below about 7.8, but as soon as the pH of the medium rises above this level, penicillin production is sharply terminated. When the adjuvants of the present invention are incorporated into the medium before this rise in pH or immediately after the pH has started to rise, the phthalic acid or the source of phthalate ion lowers the pH of the medium thereby obviating this undesirable termination. Neutralizing agents or buffers other than those of the present invention, such as hydroxides, carbonates, phosphates, etc. have been used. The following example bears out the fact that these neutralizing agents or buffers produce far inferior results as compared with the use of phthalic acid or a source of phthalate ion.

*Example II*

A medium was prepared containing—

| | |
|---|---|
| Corn steep liquor | 20 g./l. (dry basis) |
| Lactose | 50 g./l. |
| β-phenylethylamine | 2.5 g./l. |
| Sodium nitrate | 3 g./l. |
| Calcium carbonate | 2 g./l. |
| Monopotassium phospate | 0.50 g./l. |
| Magnesium sulfate | 0.25 g./l. |
| Zinc sulfate | 0.04 g./l. |

This medium was distributed into Erlenmeyer flasks and the following buffering agents were added:

Potassium acid phthalate at a level of 5.00 g./l.
Sodium citrate at levels of 1.25, 2.50, 5.00, 7.50, and 10.00 g./l.
Monopotassium phosphate at increased levels of 1.00, 2.00, and 5.00 g./l.

Flasks containing this media were autoclaved at 121° C. for twenty minutes, inoculated with a strain of *P. chrysogenum*, Wisconsin Q176, and incubated at 25–26° C. The results are as follows:

| Medium Variation | 6th day pH | 7th day pH | 8th day pH | Highest Penicillin Assay |
|---|---|---|---|---|
| | | | | Units/ml. |
| None | 6.80 | 7.80 | 7.90 | 1,450 |
| Monopotassium Phosphate: | | | | |
| 0.50 g./l. | 7.80 | 8.10 | 8.35 | 1,475 |
| 1.50 g./l. | 7.70 | 8.00 | 8.40 | 1,380 |
| 4.50 g./l. | 7.60 | 7.95 | 8.30 | 1,035 |
| Sodium Citrate: | | | | |
| 1.25 g./l. | 7.50 | 7.70 | 7.80 | 1,495 |
| 2.50 g./l. | 7.65 | 7.75 | 7.80 | 1,495 |
| 5.00 g./l. | 7.80 | 8.00 | 7.90 | 1,120 |
| 7.50 g./l. | 8.00 | 8.15 | 7.90 | 1,120 |
| 10.00 g./l. | 8.00 | 8.05 | 8.00 | 850 |
| Potassium Acid Phthalate, 5.00 g./l. | 6.20 | 6.75 | 7.20 | 1,675 |

A five-times concentrated solution of McIlvaines buffer at pH 4.6 was prepared and incorporated in the above medium at levels of 67 and 187 ml./l. The ineffectiveness of this buffer in controlling the pH of the medium during fermentation is shown by the following data obtained subsequent to inoculation with *P. notatum* NRRL No. 832. (The pH levels of this culture are markedly lower than those of mutants of Q176.)

| McIlvaines Buffer | Init. pH | 1st day pH | 2nd day pH | 3rd day pH | 4th day pH | 6th day pH |
|---|---|---|---|---|---|---|
| None | 4.50 | 4.95 | 6.30 | 6.50 | 6.90 | 6.90 |
| 67 ml./l. | 4.50 | 5.15 | 6.55 | 7.15 | 7.00 | 7.10 |
| 187 ml./l. | 4.50 | 5.15 | 6.85 | 7.00 | 7.00 | 7.10 |

It will be understood that the above examples are merely illustrative of the invention as regards to the composition of the media, the specific compounds, or the quantities thereof used as additions and the specific conditions described.

It is evident that the invention is capable of various modifications and that it is intended and desired therefore to embrace within the scope of this invention such variations and changes that are necessary to adapt it to varying conditions and used as defined by the scope of the appended claims.

I claim:

1. A method of producing penicillin in substantially increased yields which comprises growing a penicillin-producing mold in an aqueous medium containing from 0.025 to 1%, based on the weight of said medium, of a substance selected from the group consisting of phthalic acid and the sodium and potassium acid salts of phthalic acid.

2. A method of producing penicilin in substantially increased yields which comprises growing a penicillin-producing mold in an aqueous medium containing from 0.025 to 1% of phthalic acid, based on the weight of said medium.

3. A method of producing penicillin in substantially increased yields which comprises growing a penicillin-producing mold in an aqueous medium containing from 0.025 to 1% of sodium acid phthalate, based on the weight of said medium.

4. A method of producing penicillin in substantially increased yields which comprises growing a penicillin-producing mold in an aqueous medium containing from 0.025 to 1% of potassium acid phthalate, based on the weight of said medium.

5. A method of producing penicillin in substantially increased yields which comprises growing a penicillin-producing mold in an aqueous medium containing about 0.5%, based on the weight of said medium, of a substance selected from the group consisting of phthalic acid and the sodium and potassium acid salts of phthalic acid.

6. A method of producing penicillin in substantially increased yields which comprises growing a penicillin-producing mold in an aqueous medium containing about 0.5% of phthalic acid, based on the weight of said medium.

7. A method of producing penicillin in substantially increased yields which comprises growing a penicillin-producing mold in an aqueous medium containing about 0.5% of sodium acid phthalate, based on the weight of said medium.

8. A method of producing penicillin in substantially increased yields which comprises growing a penicillin-producing mold in an aqueous medium containing about 0.5% of potassium acid phthalate, based on the weight of said medium.

UNITED STATES PATENTS

| Number | Name | Date |
|---|---|---|
| 2,424,832 | Koerber | July 29, 1947 |

OTHER REFERENCES

Levine et al., "A Compilation of Culture Media," 1930, page 130.

Britton, "Hydrogen Ions," vol. 1, 1943, page 321.